(12) United States Patent
Iwamura et al.

(10) Patent No.: US 11,574,399 B2
(45) Date of Patent: Feb. 7, 2023

(54) ABNORMAL STATE DETECTION DEVICE, ABNORMAL STATE DETECTION METHOD, AND RECORDING MEDIUM

(71) Applicant: OMRON Corporation, Kyoto (JP)

(72) Inventors: Shintaro Iwamura, Otsu (JP); Kakuto Shirane, Moriyama (JP)

(73) Assignee: OMRON Corporation, Kyoto (JP)

( * ) Notice: Subject to any disclaimer, the term of this patent is extended or adjusted under 35 U.S.C. 154(b) by 306 days.

(21) Appl. No.: 16/639,737

(22) PCT Filed: Oct. 29, 2018

(86) PCT No.: PCT/JP2018/040054
§ 371 (c)(1),
(2) Date: Feb. 17, 2020

(87) PCT Pub. No.: WO2019/093171
PCT Pub. Date: May 16, 2019

(65) Prior Publication Data
US 2021/0125321 A1  Apr. 29, 2021

(30) Foreign Application Priority Data
Nov. 10, 2017  (JP) .............................. JP2017-216985

(51) Int. Cl.
*G06F 15/16* (2006.01)
*G06F 9/54* (2006.01)
(Continued)

(52) U.S. Cl.
CPC .............. *G06T 7/001* (2013.01); *G06F 11/32* (2013.01); *G06T 7/0006* (2013.01)

(58) Field of Classification Search
CPC ........ G06T 7/001; G06T 7/0006; G06F 11/32
(Continued)

(56) References Cited

U.S. PATENT DOCUMENTS 4,460,969 A * 7/1984 Chen ...................... G06V 10/42
708/410
6,133,844 A * 10/2000 Ahne ................... G06K 15/005
340/815.45
(Continued)

FOREIGN PATENT DOCUMENTS

EP         2770435         8/2014
EP         2784681         10/2014
(Continued)

OTHER PUBLICATIONS

"International Search Report (Form PCT/ISA/210)" of PCT/JP2018/040054, dated Jan. 29, 2019, with English translation thereof, pp. 1-4.
(Continued)

*Primary Examiner* — Hamza N Algibhah
(74) *Attorney, Agent, or Firm* — JCIPRNET (57) ABSTRACT

An abnormal state detection device includes: an acquisition unit that acquires an image imaging a device that outputs an abnormal state using an LED; an analysis unit that analyzes the abnormal state of the device based on the light emission pattern of the LED in the image, and generates auxiliary information indicating the abnormal state based on the analysis result; and a display control unit that outputs the auxiliary information to a display unit.

15 Claims, 8 Drawing Sheets

(51) Int. Cl.
*H04L 29/06* (2006.01)
*G06T 7/00* (2017.01)
*G06F 11/32* (2006.01)

(58) Field of Classification Search
USPC .......................................................... 709/224
See application file for complete search history.

(56) References Cited

U.S. PATENT DOCUMENTS

| | | | | |
|---|---|---|---|---|
| 6,677,565 | B1 * | 1/2004 | Wahl ..................... | G02B 7/346 |
| | | | | 250/201.3 |
| 8,958,091 | B2 * | 2/2015 | Suzuki ............... | G03G 15/5016 |
| | | | | 358/1.14 |
| 9,432,571 | B2 * | 8/2016 | Yamada .............. | G06F 11/3055 |
| 10,209,202 | B1 * | 2/2019 | Sullivan .............. | G01N 21/8806 |
| RE48,417 | E * | 2/2021 | Marks .................. | G06V 40/107 |
| 2006/0026474 | A1 * | 2/2006 | Honda .................. | G06F 3/1234 |
| | | | | 714/728 |
| 2007/0133843 | A1 * | 6/2007 | Nakatani ............. | G07F 17/0014 |
| | | | | 358/1.15 |
| 2009/0122146 | A1 * | 5/2009 | Zalewski ............. | A63F 13/211 |
| | | | | 348/E13.001 |
| 2010/0214214 | A1 * | 8/2010 | Corson ................ | G06F 3/0346 |
| | | | | 345/158 |
| 2011/0309947 | A1 * | 12/2011 | Zhang .................. | G06F 11/326 |
| | | | | 340/691.8 |
| 2012/0259973 | A1 * | 10/2012 | Windell .............. | G06F 11/0793 |
| | | | | 709/224 |
| 2013/0027737 | A1 * | 1/2013 | Suzuki ............... | G03G 15/5016 |
| | | | | 358/1.14 |
| 2013/0084981 | A1 * | 4/2013 | Zalewski ............. | A63F 13/211 |
| | | | | 463/36 |
| 2014/0036149 | A1 * | 2/2014 | Ogawa ............. | H04N 21/43637 |
| | | | | 348/468 |
| 2014/0211984 | A1 * | 7/2014 | Calio .................... | G06V 20/00 |
| | | | | 382/103 |
| 2014/0232882 | A1 * | 8/2014 | Yamada .................... | G06T 1/00 |
| | | | | 348/207.1 |
| 2015/0347259 | A1 * | 12/2015 | Katou ................. | G06F 11/3044 |
| | | | | 348/143 |
| 2017/0045877 | A1 * | 2/2017 | Shapiro .................. | G05B 19/18 |
| 2017/0054657 | A1 * | 2/2017 | Emmanuel ............. | H04L 49/40 |
| 2021/0289604 | A1 * | 9/2021 | Ando ................... | G06V 10/145 |

FOREIGN PATENT DOCUMENTS

| | | | | |
|---|---|---|---|---|
| EP | | 2784681 A1 * | 10/2014 | .......... G06F 11/3055 |
| JP | | 2005242916 | 9/2005 | |
| JP | | 2012-018605 | 1/2012 | |
| JP | | 2014010529 | 1/2014 | |
| JP | | 2015130052 | 7/2015 | |
| JP | | 2016006595 | 1/2016 | |
| WO | | 2015068275 | 5/2015 | |

OTHER PUBLICATIONS

"Written Opinion of the International Searching Authority (Form PCT/ISA/237)" of PCT/JP2018/040054, dated Jan. 29, 2019, with English translation thereof, pp. 1-12.

"Search Report of Europe Counterpart Application", dated Jun. 22, 2021, p. 1-p. 9.

Disclosed Anonymously, "Using Augmented Reality to Enhance Diagnostics, Repair and Assembly," ip.com Inc., Nov. 2012, pp. 1-3.

Office Action of Japan Counterpart Application, with English translation thereof, dated Nov. 4, 2020, pp. 1-14.

\* cited by examiner

ABNORMAL STATE DETECTION DEVICE, ABNORMAL STATE DETECTION METHOD, AND RECORDING MEDIUM

CROSS-REFERENCE TO RELATED APPLICATION

This application is a 371 application of the International PCT application serial no. PCT/JP2018/040054, filed on Oct. 29, 2018, which claims the priority benefit of Japan Patent Application No. 2017-216985, filed on Nov. 10, 2017. The entirety of each of the above-mentioned patent applications is hereby incorporated by reference herein and made a part of this specification.

TECHNICAL FIELD

The present invention relates to a technique for displaying an abnormal state of a device.

BACKGROUND ART

A device disclosed in Patent Literature 1 (Japanese Patent Application Laid-Open No. 2012-018605) images an appearance of a detection target device using a monitoring camera and receives information for identifying a state of the device using a dedicated communication means. When an abnormality occurs in the device, it superimposes and displays information for identifying an abnormal state on an image of the device.

SUMMARY OF INVENTION

Technical Problem

However, in a case of using the technique disclosed in Patent Literature 1, it is required to receive the state of the device using a dedicated communication means. In addition, in order to secure the communication means, a device therefor, a place for installing the device, and construction and maintenance of the device are required, which is not convenient.

Therefore, an object of the present invention is to allow an abnormal state to be confirmed easily while minimizing constituents of a device for identifying an abnormal state of a device.

Solution to Problem

This abnormal state detection device includes an acquisition unit that acquires an image imaging a device that performs an output of an abnormal state using a light emitting diode (LED), an analysis unit that analyzes the abnormal state of the device based on a light emission pattern of the LED in the image, and generates auxiliary information indicating the abnormal state based on an analysis result, and a display control unit that outputs the auxiliary information to a display unit.

With this configuration, the abnormal state of the device can be analyzed from the image of the light emission pattern of the LED due to a type of abnormality of the device being associated with a light emission pattern of the LED. Based on the analysis result, the abnormal state of the device or the auxiliary information for eliminating the abnormal state can be generated and displayed.

The display control unit of the abnormal state detection device may superimpose and display the auxiliary information over a part of the image.

With this configuration, since a lighting state of the device and the auxiliary information can be displayed on the same screen, good visibility is provided.

The analysis unit of the abnormal state detection device may generate the auxiliary information based on results in which analysis is performed using a plurality of images obtained by continuously capturing images of the device.

With this configuration, since a blinking pattern or the like can be analyzed, various pieces of detailed auxiliary information can be displayed.

The analysis unit of the abnormal state detection device may analyze the abnormal state from a plurality of locations in the image.

With this configuration, even when a detection target device has a plurality of LEDs or a plurality of devices are displayed, the abnormal state can be analyzed for each.

The abnormal state detection device may associate the image, the abnormal state, and the auxiliary information with each other and store them, and the analysis unit may obtain the auxiliary information based on the image or the abnormal state stored in a storage unit.

With this configuration, since a plurality of pieces of information are associated with each other, it is possible to efficiently search for the auxiliary information.

The analysis unit of the abnormal state detection device may associate the auxiliary information with the abnormal state and the image and store the auxiliary information.

With this configuration, even when auxiliary information does not exist, the abnormal state and the image can be stored in association with each other. Thus, this can be used for the next analysis.

The analysis unit of the abnormal state detection device may change the auxiliary information in accordance with a change of the abnormal state.

With this configuration, even when required auxiliary information changes due to a change of an abnormal state, appropriate auxiliary information can be obtained. Thus, an abnormal state can be smoothly resolved.

The communication unit of the abnormal state detection device may receive the auxiliary information by transmitting the image or the analysis results.

With this configuration, in an external device (apparatus), the auxiliary information can be obtained by analyzing the image, or the auxiliary information can be obtained from the analysis result, and thus constituents of the abnormal state detection device can be minimized.

Advantageous Effects of Invention

According to the present invention, constituents of a device for identifying an abnormal state of a device can be minimized, and a user can easily check the abnormal state of the device.

DESCRIPTION OF EMBODIMENTS

Application Example

Figure 4:
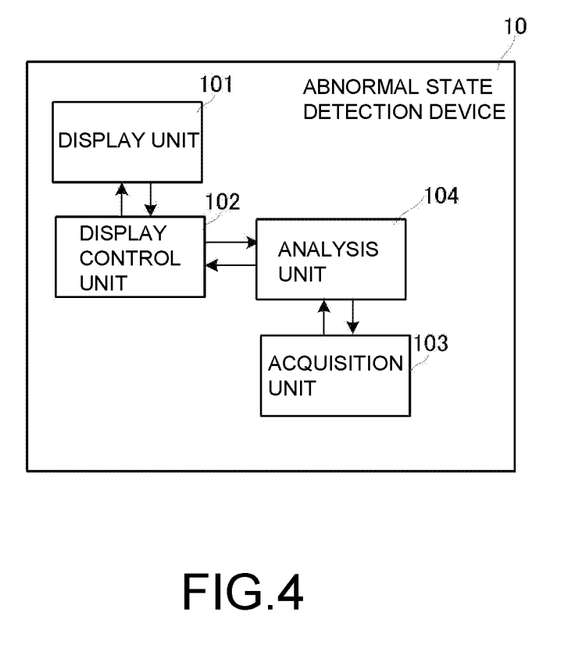
FIG. 4 is a block diagram of the abnormal state detection device according to the first embodiment of the present invention.

First, an example adopting the present invention will be described with reference to FIG. 4. FIG. 4 is a block diagram illustrating functions of an abnormal state detection device according to a first embodiment.

As shown in FIG. 4, the abnormal state detection device 10 includes a display unit 101, a display control unit 102, an acquisition unit 103, and an analysis unit 104.

The acquisition unit 103 acquires an image of a device (not shown) of which an abnormal state is desired to be detected. The acquisition unit 103 outputs the acquired image to the analysis unit 104. The analysis unit 104 determines an abnormal state of the device based on the acquired image. The analysis unit 104 generates auxiliary information indicating details or the like of the abnormal state based on the determination results and outputs the auxiliary information to the display control unit 102. The display control unit 102 outputs auxiliary information to be superimposed on an image of the device displayed on the display unit 101.

Thus, an abnormal state can be determined based on a captured image. In addition, the auxiliary information can be generated based on results of determining an abnormal state, and the auxiliary information including the abnormal state can be displayed.

Configurational Example 1

Figure 1:
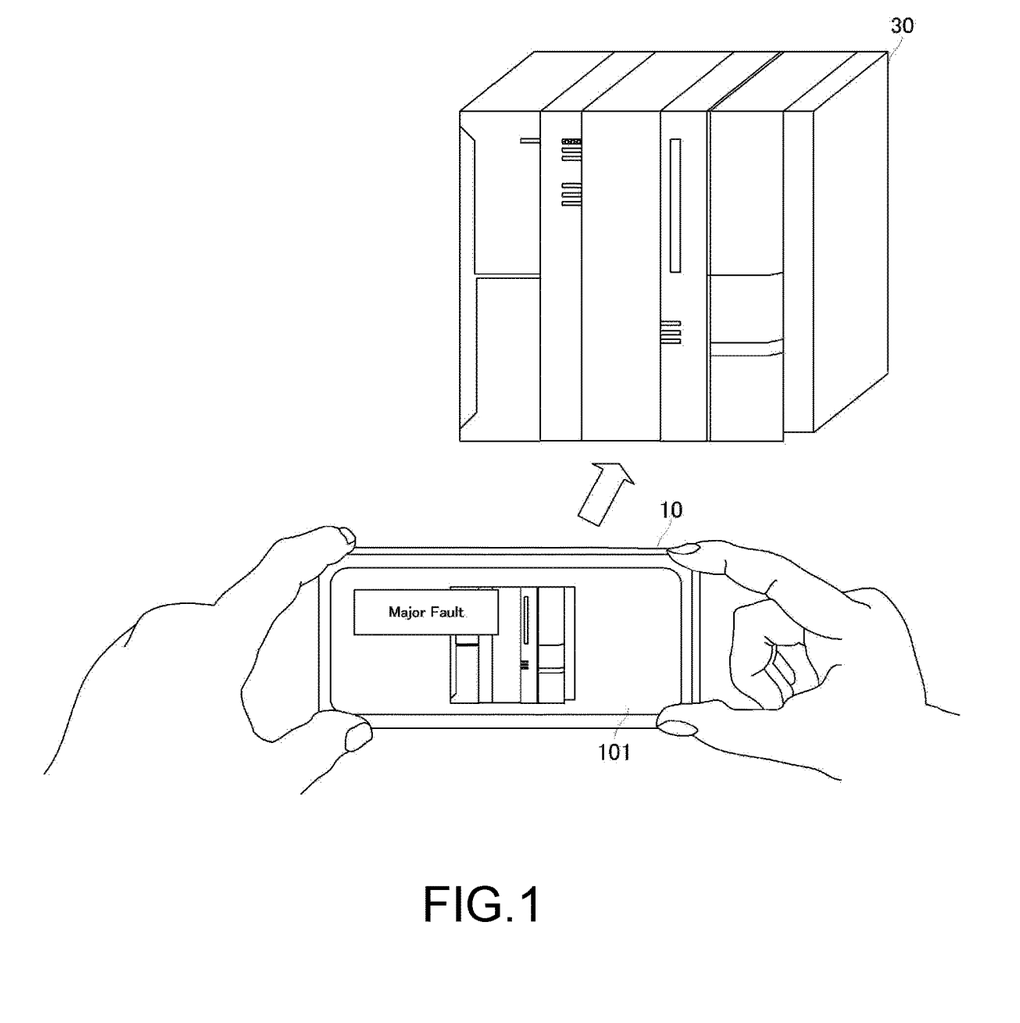
FIG. 1 is a diagram showing an outline of an abnormal state detection device according to a first embodiment of the present invention.
Figure 2:
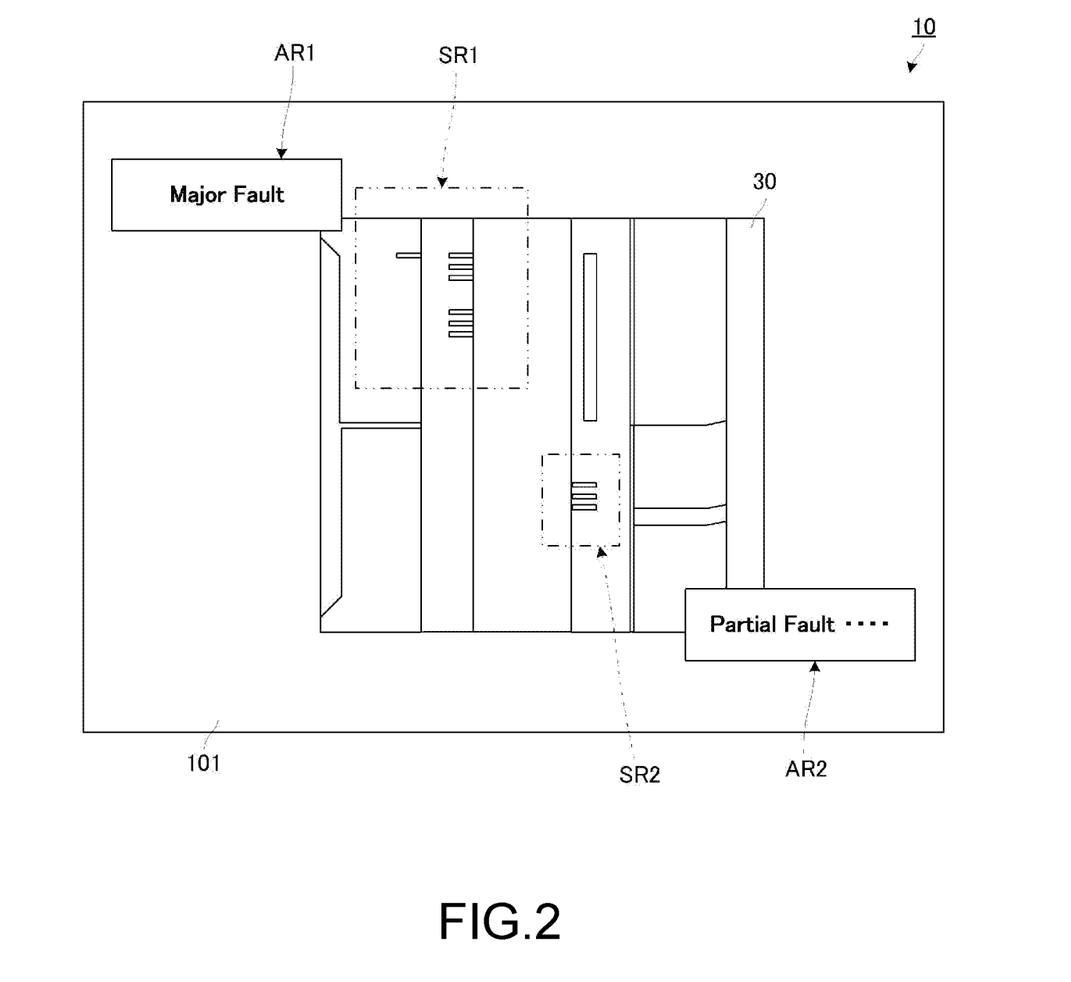
FIG. 2 is an enlarged view of a display of the abnormal state detection device according to the first embodiment of the present invention.
Figure 3:
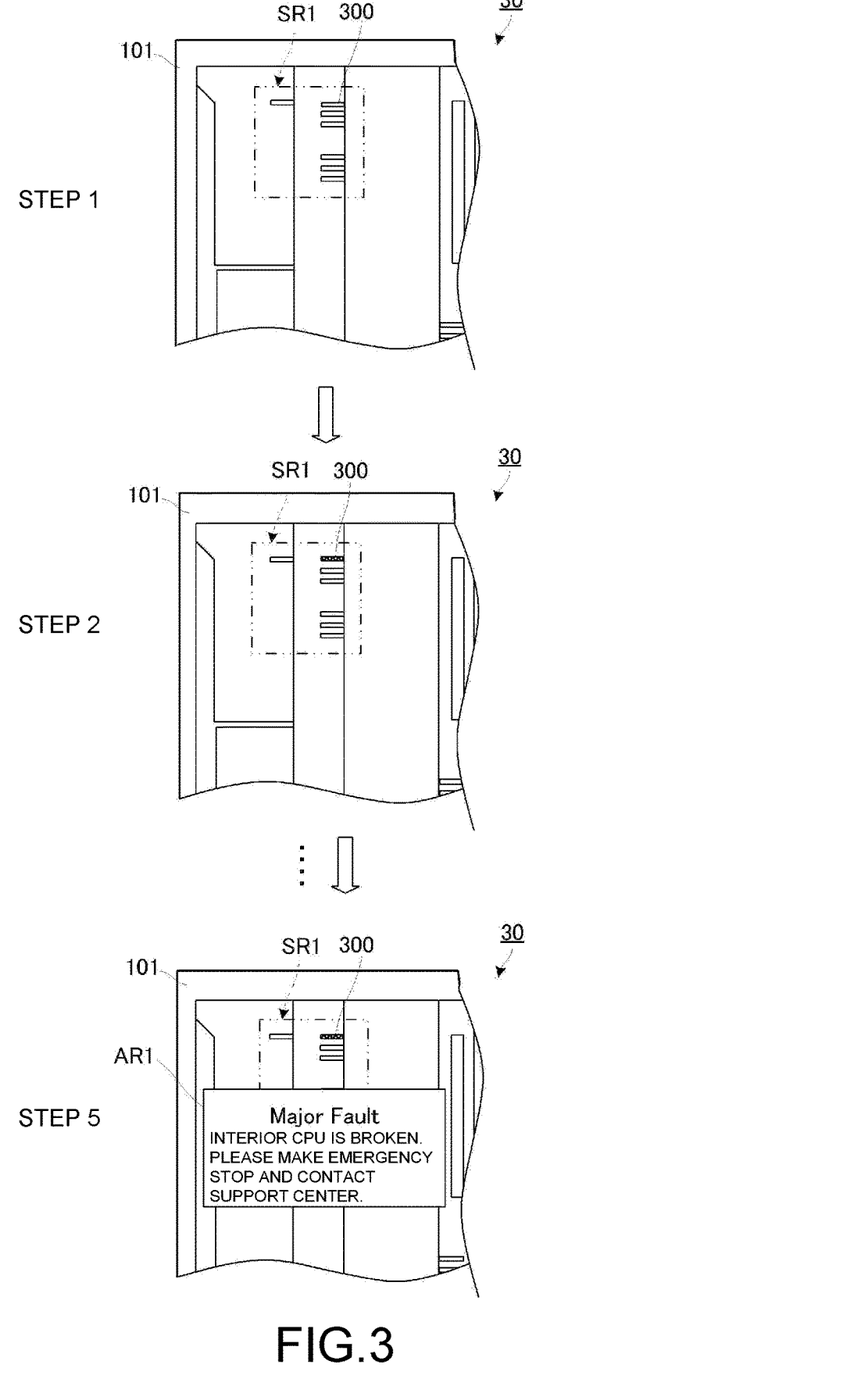
FIG. 3 is an image diagram showing a procedure in which the abnormal state detection device according to the first embodiment of the present invention detects an abnormal state.
Figure 5:
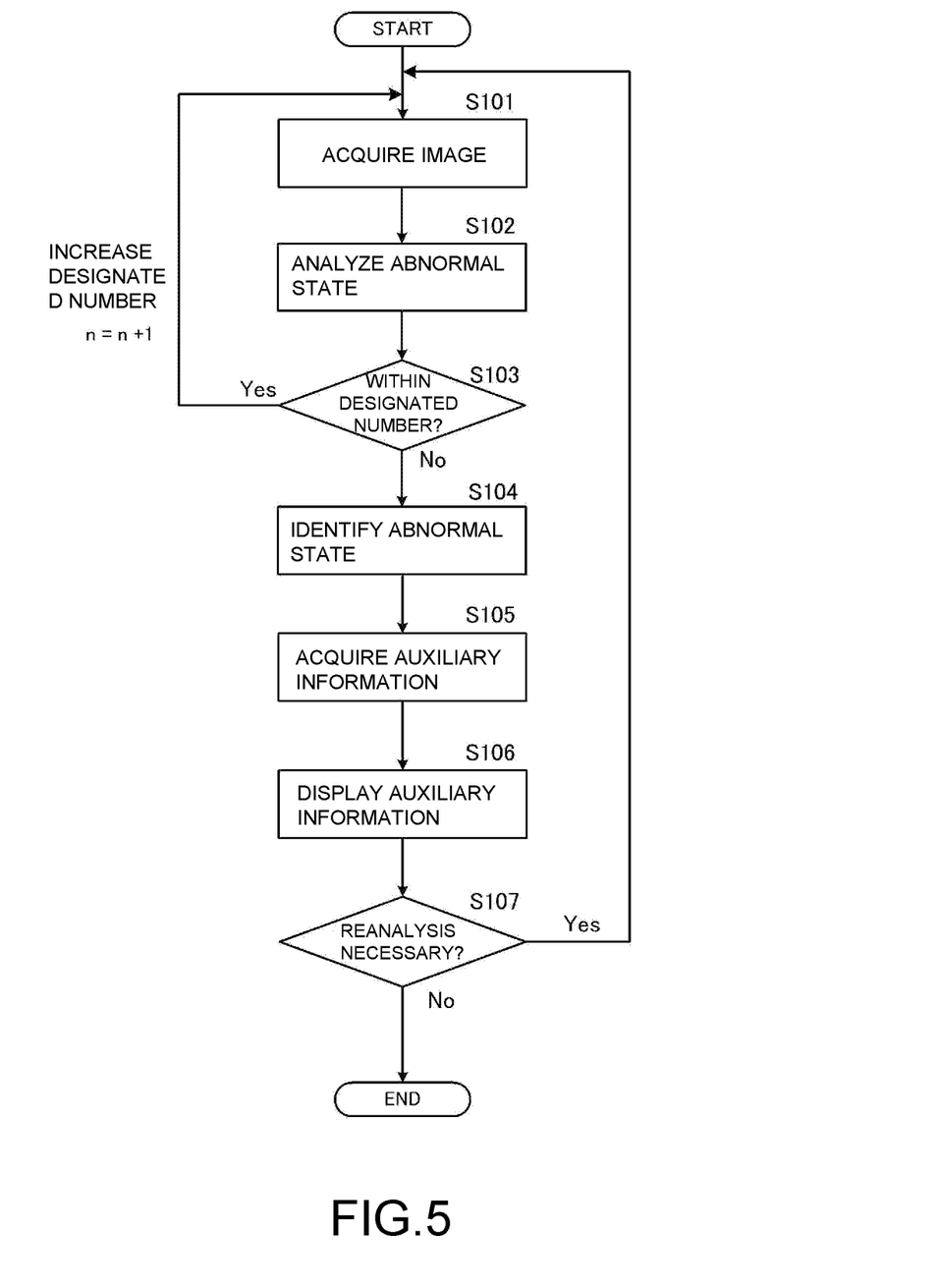
FIG. 5 is a flowchart for displaying auxiliary information in the abnormal state detection device according to the first embodiment of the present invention.

FIG. 1 is a diagram showing an outline of the abnormal state detection device according to the first embodiment of the present invention. FIG. 2 is an enlarged view of a display screen of the abnormal state detection device according to the first embodiment of the present invention. FIG. 3 is an image diagram showing a procedure in which the abnormal state detection device according to the first embodiment of the present invention detects an abnormal state. FIG. 4 is a block diagram of the abnormal state detection device according to the first embodiment of the present invention, as described above. FIG. 5 is a flowchart for displaying auxiliary information in the abnormal state detection device according to the first embodiment of the present invention.

First, an outline of the abnormal state detection device according to the first embodiment will be described with reference to FIGS. 1 and 2.

In the example shown in FIG. 1, an image of the device 30 is acquired by the acquisition unit (a camera) 103 included in the abnormal state detection device 10. The entire image of the device 30 is displayed on the display unit 101 of the abnormal state detection device 10. The abnormal state detection device 10 may be, for example, any electronic device having an imaging (camera) function such as a smartphone and a tablet.

As shown in FIG. 2, the device 30 has state display regions SR1 and SR2 using light emitting diodes (LEDs). In addition, auxiliary information display regions AR1 and AR2 are set on the display unit 101 as shown in FIG. 2, the auxiliary information display region AR1 corresponding to a region for displaying auxiliary information on the state display region SR1. Similarly, the auxiliary information display region AR2 corresponds to a region for displaying auxiliary information on the state display region SR2.

The state display regions SR1 and SR2 can be identified by using a known image recognition technique for an image of the device 30.

The auxiliary information is displayed in the auxiliary information display region AR1 when the LEDs in the state display region SR1 indicate an abnormal state. Similarly, the auxiliary information is displayed in the auxiliary information display region AR2 when the LEDs in the state display region SR2 indicate an abnormal state.

Although an example in which an entire image of the device 30 is captured has been described in the present embodiment, it is sufficient if at least a region such as the state display regions SR1 and SR2 that can indicate an abnormal state using the LEDs or the like is captured, as described above.

In the example shown in FIG. 3, a flow of displaying auxiliary information in the auxiliary information display region AR1 is shown, and in Steps 1, 2, and 5, the LEDs 300 emit light to indicate an abnormal state.

In an image of Step 1 acquired by the acquisition unit (camera) 103, the LEDs 300 are not emitting light.

In an image of Step 2 acquired by the acquisition unit (camera) 103, the LEDs 300 are emitting red light.

If the LEDs 300 continuously emit red light from Step 2 to Step 5 (Steps 3 and 4 are omitted), the analysis unit 104 determines that an abnormal state has occurred based on the image of Step 5.

Next, the analysis unit 104 generates auxiliary information. The analysis unit 104 transmits the auxiliary information to the display control unit 102.

The display control unit 102 superimposes the auxiliary information on the captured image of the device 30 of the display unit 101 and displays the auxiliary information in the auxiliary information display region AR1.

Further, the auxiliary information may be, for example, a word indicating an abnormal state, a description regarding the details of the abnormal state, and wording indicating a solution for eliminating the abnormal state. Also, information obtained by combining an abnormal state with explanation means may be used as the auxiliary information.

If the wording has a number of characters that cannot be displayed in the auxiliary information display region AR1, the auxiliary information display region AR1 may be scrolled, or the solution may be displayed in a separated manner (the solution is made stepwise) so that an abnormal state can be eliminated step by step.

Here, a specific method for displaying the auxiliary information in the auxiliary information display region AR1 will be described.

In order to configure the auxiliary information display region AR1, for example, an augmented reality (AR) technology that is a technology for augmenting reality may be used. In the present invention, by using AR technology, a type of an abnormal state and a handling method therefor are displayed to be superimposed in the vicinity of a position of the LEDs 300 of the device 30 that is determined to be in an abnormal state.

For example, a marker-less type vision-based AR technology may be used. When the LEDs 300 are determined to be in an abnormal state by analyzing a light emission pattern of the LEDs 300, the auxiliary information display region AR1 is superimposed near a position where the LEDs 300 emit light.

Next, a flow of the specific processing will be described with reference to FIGS. 4 and 5. As described above, the acquisition unit 103 acquires images continuously to include the LEDs of the device (not shown) of which an abnormal state is desired to be detected in the images or acquires a video thereof.

As described above, the abnormal state detection device 10 includes the display unit 101, the display control unit 102, the acquisition unit 103, and the analysis unit 104.

The acquisition unit 103 outputs the acquired images to the analysis unit 104. By outputting the continuously acquired images, analysis accuracy can be further improved.

The analysis unit 104 analyzes the light emission pattern of the LEDs from the plurality of acquired images. As a specific analysis method of the light emission pattern of the LEDs using the images, for example, there is a method of comparing brightnesses of the LEDs of the plurality of images. By acquiring a change in luminance of the same LED, the light emission pattern of the LEDs can be determined. Further, a method of analyzing the light emission pattern of the LEDs using a video may be, for example, a method of defining frame rates of the video and acquiring a change in luminance of the same LED for each frame rate. This makes it possible to determine the light emission pattern of the LEDs.

The light emission pattern of the LEDs is associated with abnormal states. Therefore, the analysis unit 104 can detect an abnormal state from the light emission pattern.

In addition, even when a plurality of LEDs are present, an abnormal state can be determined by the same processing, and auxiliary information when two or more LEDs are combined can be obtained.

The analysis unit 104 outputs the auxiliary information to the display control unit 102 using AR technology. The display control unit 102 outputs the auxiliary information to the display unit 101. The display unit 101 superimposes the captured image of the device and displays the auxiliary information.

A flow of processing will be described with reference to the flowchart of FIG. 5.

The acquisition unit 103 acquires an image or a video (S101).

The analysis unit 104 receives the image or the video from the acquisition unit 103 and analyzes an abnormal state (S102). The analysis unit 104 determines whether or not the number of times in which an abnormal state is able to be determined (the designated number of times: n) has been reached (S103). If the number of times is within the designated number (S103: Yes), the steps of acquiring the image (S101) and analyzing an abnormal state (S102) are repeated to acquire the abnormal state (S104).

The analysis unit 104 acquires the auxiliary information from the storage unit 105 (S105). The analysis unit 104 outputs the auxiliary information to the display control unit 102. The display control unit 102 displays the auxiliary information on the display unit 101 (S106).

The analysis unit 104 determines whether reanalysis is necessary (S107) or not. If there has not been complete recovery from an abnormal state due to a change of the abnormal state, reanalysis is determined to be required (S107: Yes) and the acquisition unit 103 acquires an image or a video again (S101).

When the analysis unit 104 determines that an abnormal state has transitioned to a normal state and that reanalysis is unnecessary (S107: No), the processing ends.

Also, in the step (S107) of determining whether reanalysis is necessary or not, when it is determined that recovery from an abnormal state is not possible even if reanalysis were continued, the flow may be terminated.

Further, when the number of times exceeds the designated number (S103: No), repetition of the steps is terminated, the step of acquiring the abnormal state (S104) is executed, and the subsequent steps are executed.

Also, when an abnormal state cannot be identified (S102), the analysis unit 104 may end the flow.

Configurational Example 2

Figure 6:
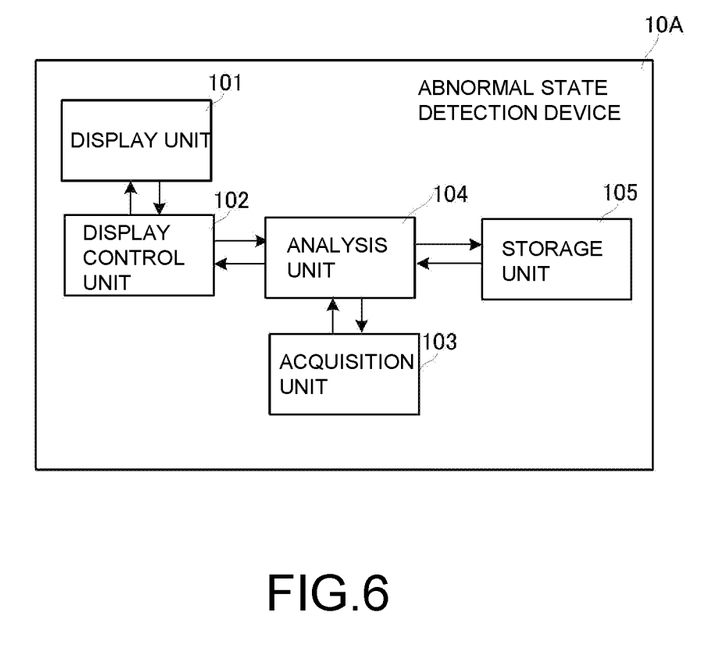
FIG. 6 is a block diagram of an abnormal state detection device according to a second embodiment of the present invention.
Figure 7:
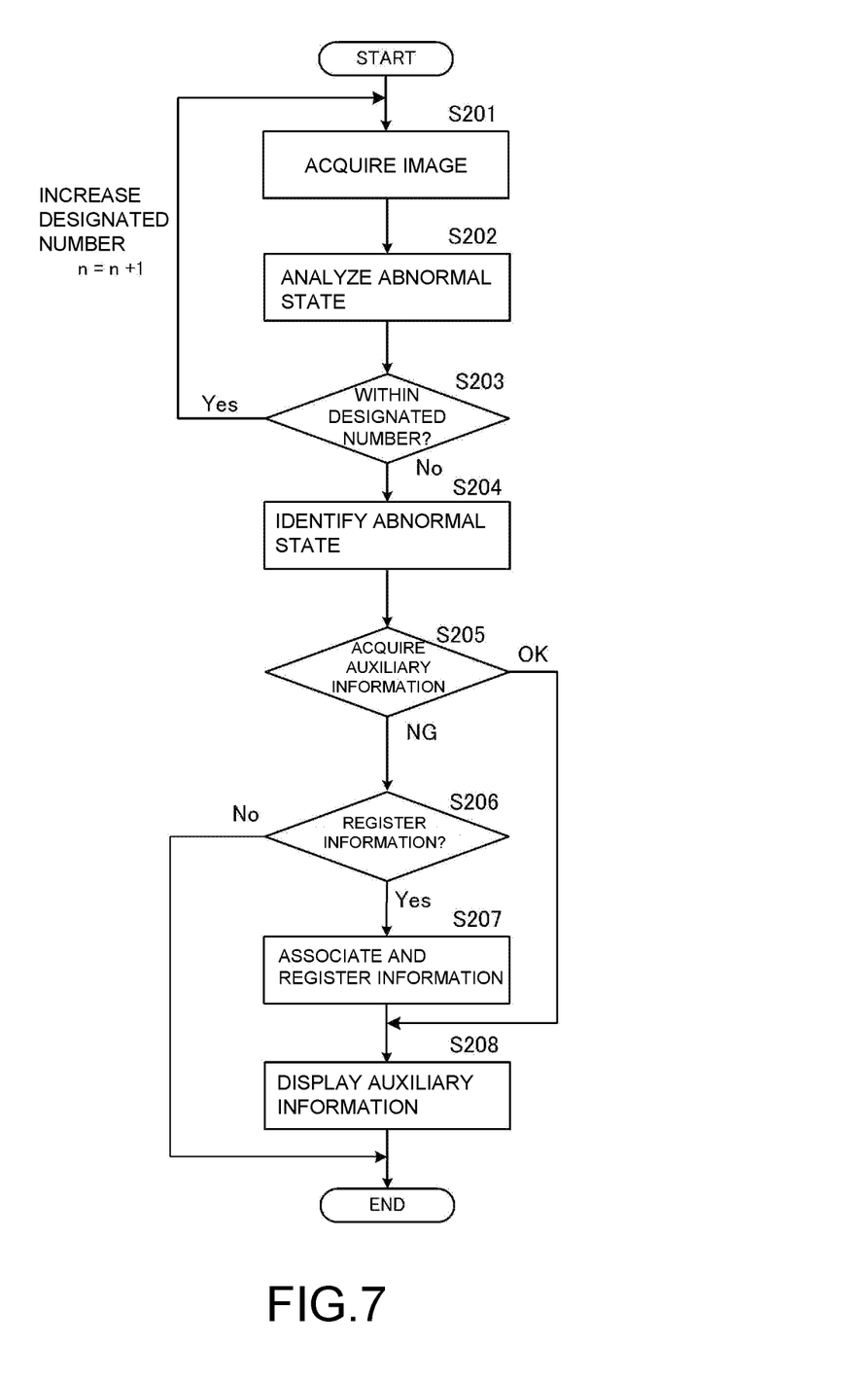
FIG. 7 is a flowchart for registering and displaying auxiliary information in the abnormal state detection device according to the second embodiment of the present invention.

Next, an outline of an abnormal state detection device according to a second embodiment will be described with reference to FIGS. 6 and 7. FIG. 6 is a block diagram of the abnormal state detection device according to the second embodiment of the present invention. FIG. 7 is a flowchart for registering and displaying auxiliary information in the abnormal state detection device according to the second embodiment of the present invention.

As shown in FIG. 6, an abnormal state detection device 10A includes the display unit 101, the display control unit 102, the acquisition unit 103, the analysis unit 104, and a storage unit 105. The abnormal state detection device 10A according to the second embodiment is different from the abnormal state detection device 10 according to the first embodiment in that the storage unit 105 is provided and a function of registering auxiliary information is provided. The other configuration of the abnormal state detection device 10A is the same as that of the abnormal state detection device 10, and the description of the same parts will be omitted.

As shown in FIGS. 6 and 7, the storage unit 105 associates a light emission pattern, an abnormal state, and auxiliary information with each other and stores them. The analysis unit 104 makes an inquiry to the storage unit 105 as necessary. The analysis unit 104 acquires the auxiliary information registered in the storage unit 105 based on the light emission pattern.

The acquisition unit 103 acquires an image or a video (S201).

The analysis unit 104 receives the image or the video from the acquisition unit 103 and analyzes an abnormal state (S202). The analysis unit 104 determines whether or not the number of times is a number (the designated number of times: n) in which an abnormal state is able to be analyzed (S203). If the number of times is within the designated number (S203: Yes), the steps of acquiring the image (S201) and analyzing an abnormal state (S202) are repeated to identify an abnormal state (S204).

The analysis unit 104 determines whether or not auxiliary information can be obtained from the storage unit 105 (S205). If the auxiliary information cannot be obtained (S205: No), the analysis unit 104 determines whether to register the abnormal state (S206) that is occurring. When the abnormal state is registered (S206: Yes), the analysis unit 104 associates the image (or video) acquired by the acquisition unit 103 with the auxiliary information associated with the image or video and registers them (S207). Whether an abnormal state can be registered or not can be selected by an operation input unit (not shown).

The analysis unit 104 outputs the auxiliary information to the display control unit 102, and the display control unit 102 displays the auxiliary information on the display unit 101 (S208).

Further, when the designated number of times has been exceeded (S203: No), repetition of the steps is terminated, the step of identifying an abnormal state (S204) is executed, and the subsequent steps are executed.

If the auxiliary information can be obtained (S205: Yes), the analysis unit 104 outputs the auxiliary information to the display control unit 102, and the display control unit 102 displays the auxiliary information on the display unit 101 (S208).

If the auxiliary information is not registered (S206: No), the analysis unit 104 ends the flow.

Also, it is not necessary to make an inquiry to the storage unit 105 for all light emission patterns of the LEDs, and the analysis unit 104 may display the auxiliary information for itself based on the light emission pattern of the LEDs.

Also, the input when registering the auxiliary information may be performed by using a software keyboard or the like of the abnormal state detection device 10A.

Configurational Example 3

Figure 8:
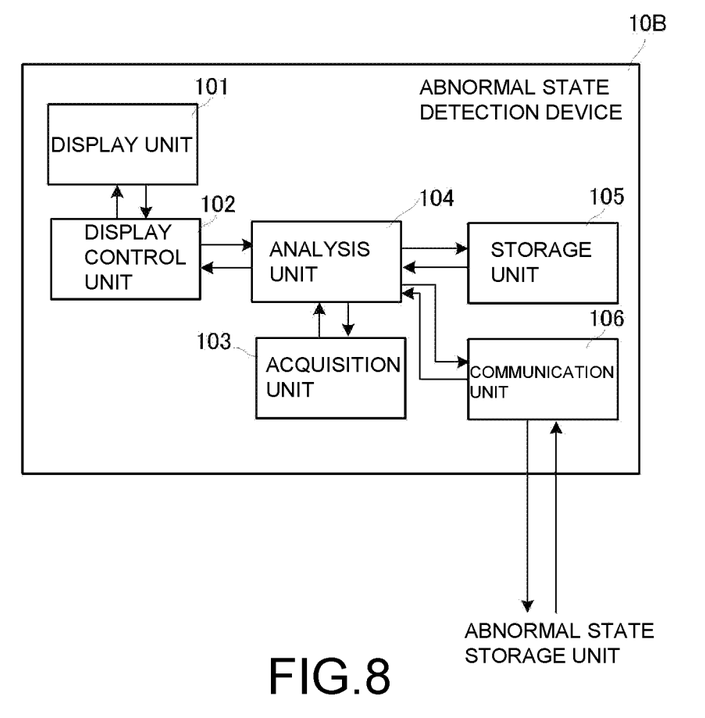
FIG. 8 is a block diagram of an abnormal state detection device according to a third embodiment of the present invention.

Next, an outline of an abnormal state detection device according to a third embodiment will be described with reference to FIG. 8. FIG. 8 is a block diagram of the abnormal state detection device according to the third embodiment of the present invention.

As shown in FIG. 8, an abnormal state detection device 10B according to the third embodiment is different from the abnormal state detection device 10 according to the first embodiment in that a storage unit 105 and a communication unit 106 are provided. The other configuration of the abnormal state detection device 10B is the same as that of the abnormal state detection device 10, and the description of the same parts will be omitted.

The abnormal state detection device 10B includes the display unit 101, the display control unit 102, the acquisition unit 103, the analysis unit 104, the storage unit 105, and the communication unit 106.

The acquisition unit 103 outputs an acquired image to the analysis unit 104.

The analysis unit 104 analyzes a light emission pattern of the LEDs in the plurality of acquired image. The analysis unit 104 transmits the light emission pattern of the LEDs to the communication unit 106. The communication unit 106 transmits data to an external device having an abnormal state storage unit (not shown). The communication unit 106 receives an abnormal state and an analysis method from the light emission pattern of the LEDs from the external device.

The communication unit 106 outputs the abnormal state and a solution to the analysis unit 104. The analysis unit 104 generates auxiliary information based on the acquired abnormal state and the analysis method.

Also by using this method, the display unit 101 can display the auxiliary information by superimposing it on a captured image of the device.

Further, the communication unit 106 described above communicates with the external device. However, the abnormal state may be obtained by using a general-purpose network such as the Internet or a cloud for the light emission pattern of the LEDs.

What is claimed is:

1. An abnormal state detection device comprising:
   a camera configured to acquire an image imaging a device that performs an output of an abnormal state using an LED;
   a processor configured to analyze the abnormal state of the device based on a light emission pattern of the LED in the image, wherein a type of the abnormal state of the device is associated with the light emission pattern of the LED in the image, and generates auxiliary information indicating the abnormal state based on an analysis result;
   a display control circuit configured to output the auxiliary information to a display, and
   a memory configured to store the image, the abnormal state, and the auxiliary information, and to store an association among the image, the abnormal state, and the auxiliary information,
   wherein the processor is configured to determine that the abnormal state has occurred when the image comprises a plurality of consecutive images captured by the camera with each of the plurality of consecutive images showing that the LED continuously emits a same specific light, and the plurality of the consecutive images showing that the LED continuously emits the same specific light exceeds a predetermined number, and the processor further configured to attempt to obtain from the memory the auxiliary information corresponding to the abnormal state which has been detected from the consecutive images, display the auxiliary information in response to having obtained the auxiliary infomiation from the memory, determine whether to register the abnormal state in response to not being able to obtain the auxiliary information from the memory, and associate the plurality of consecutive images with the auxiliary information in response to having registered the abnormal state.

2. The abnormal state detection device according to claim 1, wherein the display control circuit is configured to superimpose and displays the auxiliary information over a part of the image.

3. The abnormal state detection device according to claim 1, wherein the processor is configured to generate the auxiliary information based on the analysis result obtained by perfoiiiiiing analysis using a plurality of images obtained by continuously imaging the device.

4. The abnormal state detection device according to claim 1, wherein the processor is configured to analyze a plurality of abnormal states from the image.

5. The abnormal state detection device according to claim 1, wherein the processor is configured to associate the abnormal state, the image, and the auxiliary information with each other and causes the memory to store the association.

6. The abnormal state detection device according to claim 1, wherein the processor is configured to change the auxiliary information in accordance with a change of the abnormal state.

7. The abnormal state detection device according to claim 1, further comprising a communication circuit configured to transmit the image or the analysis result and receive the auxiliary information.

8. The abnormal state detection device according to claim 2, wherein the processor is configured to generate the auxiliary information based on the analysis result obtained by performing analysis using a plurality of images obtained by continuously imaging the device.

9. The abnormal state detection device according to claim 2, wherein the processor is configured to analyze a plurality of abnormal states from the image.

10. The abnormal state detection device according to claim 2, wherein the processor is configured to change the auxiliary information in accordance with a change of the abnormal state.

11. The abnormal state detection device according to claim 2, further comprising a communication circuit configured to transmit the image or the analysis result and receives the auxiliary information.

12. The abnormal state detection device according to claim 1, wherein the display control circuit is configured to display the type of the abnormal state to be superimposed in a vicinity of a position of the LED that is determined to be in the abnormal state.

13. The abnormal state detection device according to claim 1, wherein the specific light is a red light.

14. An abnormal state detection method using an abnormal state detection device which executes steps of:
    acquiring an image of a device in an abnormal state;
    analyzing the abnormal state of the device from the image based on a light emission pattern of an LED in the image, wherein a type of the abnormal state of the device is associated with the light emission pattern of the LED in the image, and generating auxiliary information indicating the abnormal state based on an analysis result;
    storing in a memory the image, the abnormal state, and the auxiliary information, and storing in the memory an association among the image, the abnormal state, and the auxiliary information;
    outputting the auxiliary information to a display, wherein the abnormal state is determined to be occurred when the image comprises a plurality of consecutive images which has been captured by a camera with each of the plurality of consecutive images showing that the LED continuously emits a same specific light, and the plurality of the consecutive images showing that the LED continuously emit the same specific light exceeds a predetermined number;
    attempting to obtain from the memory the auxiliary information corresponding to the abnormal state which has been detected from the plurality of consecutive images;
    displaying on the display the auxiliary information in response to having obtained the auxiliary information from the memory;
    determining whether to register the abnormal state in response to not being able to obtain the auxiliary information from the memory, and associating the plurality of consecutive images with the auxiliary information in response to having registered the abnormal state.

15. A non-transitory computer-readable recording medium that stores an abnormal state detection program which causes a computer to execute processes of:
    acquiring an image of a device in an abnormal state;
    analyzing the abnormal state of the device from the image based on a light emission pattern of an LED in the image, wherein a type of the abnormal state of the device is associated with the light emission pattern of the LED in the image, and generating auxiliary information indicating the abnormal state based on an analysis result;
    storing in a memory the image, the abnormal state, and the auxiliary information, and storing in the memory an association among the image, the abnormal state, and the auxiliary information;
    outputting the auxiliary information to a display, wherein the abnormal state is determined to be occurred when the image comprises a plurality of consecutive images which has been capture by a camera with each of the plurality of consecutive images showing that the LED continuously emits a same specific light, and the plurality of the consecutive images showing that the LED continuously emits the same specific light exceeds a predetermined number;
    attempting to obtain from the memory the auxiliary information corresponding to the abnormal state which has been detected from the plurality of consecutive images;
    displaying on the display the auxiliary information in response to having obtained the auxiliary information from the memory;
    determining whether to register the abnormal state in response to not being able to obtain the auxiliary information from the memory, and
    associating the plurality of consecutive images with the auxiliary information in response to having registered the abnormal state.

* * * * *